US007477962B2

(12) United States Patent
Osumi et al.

(10) Patent No.: US 7,477,962 B2
(45) Date of Patent: Jan. 13, 2009

(54) METHOD FOR MANUFACTURING WOODEN DECORATIVE MATERIAL

(75) Inventors: Hisayoshi Osumi, Shuchi-gun (JP); Makoto Miyazaki, Hamamatsu (JP); Shigetaka Yamamoto, Tenryu (JP); Yoshihisa Maruyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 549 days.

(21) Appl. No.: 10/970,693

(22) Filed: Oct. 22, 2004

(65) Prior Publication Data

US 2005/0108984 A1 May 26, 2005

(30) Foreign Application Priority Data

Oct. 27, 2003 (JP) .......................... P 2003-366221
Oct. 27, 2003 (JP) .......................... P 2003-366222

(51) Int. Cl.
*G06F 19/00* (2006.01)

(52) U.S. Cl. ..................................................... 700/182

(58) Field of Classification Search ................. 700/167, 700/182, 193; 427/256, 258, 261–265, 267, 427/280, 291, 397; 144/4.8, 358; 8/402; 216/28, 29; 428/540, 541
See application file for complete search history.

(56) References Cited

U.S. PATENT DOCUMENTS 4,388,133 A * 6/1983 Hirao et al. ................. 156/245
5,145,537 A * 9/1992 Senzani ........................ 156/61
7,108,763 B2 * 9/2006 Senzani ...................... 156/264
2002/0148051 A1 10/2002 Yamamoto et al
2003/0012933 A1 * 1/2003 Senzani ...................... 428/195
2004/0028830 A1 2/2004 Bauer

FOREIGN PATENT DOCUMENTS

| | | | |
|---|---|---|---|
| DE | 594947 | A | 3/1934 |
| DE | 10031030 | A | 2/2002 |
| JP | 55-137922 | A | * 10/1980 |
| JP | 56-9401 | B | 3/1981 |
| JP | 81-048284 | B | * 11/1981 |
| JP | 57-187204 | A | 11/1982 |
| JP | 62-134202 | A | 6/1987 |
| JP | 4-22274 | U | 2/1992 |
| JP | 5-35208 | U | 5/1993 |
| JP | 6-315907 | A | 11/1994 |
| JP | 8-11106 | A | 1/1996 |
| JP | 10-329106 | A | 12/1998 |
| JP | 10-337708 | A | 12/1998 |
| JP | 2000-108486 | A | 4/2000 |

* cited by examiner

*Primary Examiner*—M. N. Von Buhr
(74) *Attorney, Agent, or Firm*—Smith Patent Office

(57) ABSTRACT

The present invention provides a method for manufacturing a wooden decorative material, comprising a bleaching step of bleaching the surface to be treated of a wood base material and a printing step of printing a pattern corresponding to a first information obtained by capturing an image of a surface of a wood material on the bleached surface of the wood base material by synchronizing the bleached surface of the wood base material with the first information.

6 Claims, 8 Drawing Sheets

METHOD FOR MANUFACTURING WOODEN DECORATIVE MATERIAL

BACKGROUND OF THE INVENTION

1. Field of the Invention

This invention relates to a method for manufacturing a wooden decorative material and a wooden decorative material manufactured thereby.

Priority is claimed on Japanese Patent Applications No. 2003-366221, filed Oct. 27, 2003, and No. 2003-366222, filed Oct. 27, 2003, the content of which are incorporated herein by reference.

2. Description of the Related Art

Since a fancy wood, such as a Claro Walnut, contains a lot of lignin, hemicellulose, and other coloring substances, the color of the wood material is uneven. Also, when many decorative materials are used contiguously, the overall color is uneven. Therefore, it is difficult to use many decorative materials as a set. These coloring substances are removed by a bleaching treatment or an alkali treatment to enhance the color evenness of the decorative material (For example, refer to Japanese Unexamined Patent Application, First Publication No. Hei 6-315907).

However, even the originally characteristic design of the fancy wood may disappear by these treatments.

Then, previously, a wooden decorative material has been practically realized which is produced by making a photocopy of an original such as a single board and a veneer plate which has a typical wood grain and printing the image directly on the surface of a wood material by using a gravure printing method (for example, refer to Japanese Examined Patent Application, Second Publication No. Sho 56-9401).

For example, a natural wood as a base material may be printed with a design of teak or rosewood to manufacture a wooden decorative material for furniture material. Because the grain design of the natural wood does not match the printed grain design of wood on the surface of those wooden decorative materials, the aspect of the wooden decorative material is quite different from that of natural wood.

SUMMARY OF THE INVENTION

The present invention was made in consideration of the above situation. An object of the present invention is to provide a method for manufacturing a wooden decorative material, which has excellent color evenness and the aspect of natural wood, and a wooden decorative material manufactured thereby.

In order to solve the aforementioned problems, the first aspect of the present invention provides a method for manufacturing a wooden decorative material, comprising a bleaching step of bleaching the surface to be treated of a wood base material and a printing step of printing a pattern corresponding to a first information obtained by capturing an image of a surface of a wood material on the bleached surface of the wood base material by synchronizing the bleached surface of the wood base material with the first information.

The second aspect of the present invention provides the method for manufacturing a wooden decorative material, further comprising the step of obtaining the first information of the surface to be treated of the wood base material by capturing an image of the surface to be treated of the wood base material before the bleaching step.

The third aspect of the present invention provides the method for manufacturing a wooden decorative material, further comprising the steps of performing an image-processing operation on the image captured from the surface to be treated to obtain the first information.

The fourth aspect of the present invention provides the method for manufacturing a wooden decorative material, further comprising a step of obtaining a second information regarding the bleached surface of the wood base material after the bleaching step, wherein the bleached surface of the wood base material is printed with a pattern corresponding to the first information by synchronizing with the second information with the first information during the printing step.

The fifth aspect of the present invention provides the method for manufacturing a wooden decorative material, wherein the bleached surface of the wood base material is printed with a pattern selected from the first information by referring resemblances between the first information and the second information during the printing step.

The sixth aspect of the present invention provides the method for manufacturing a wooden decorative material, wherein the first information is selected from among image data obtained by capturing an image of a surface of a predetermined wood material or a processed image of the image data obtained by capturing an image of a surface of the predetermined wood material.

DETAILED DESCRIPTION OF THE PREFERRED EMBODIMENTS

According to the present invention, the first embodiment of the method for manufacturing wooden decorative material is described in the following with reference to FIGS. 1A, 1B. 4A, 4B, 5A and 5B.

Figure 1A:
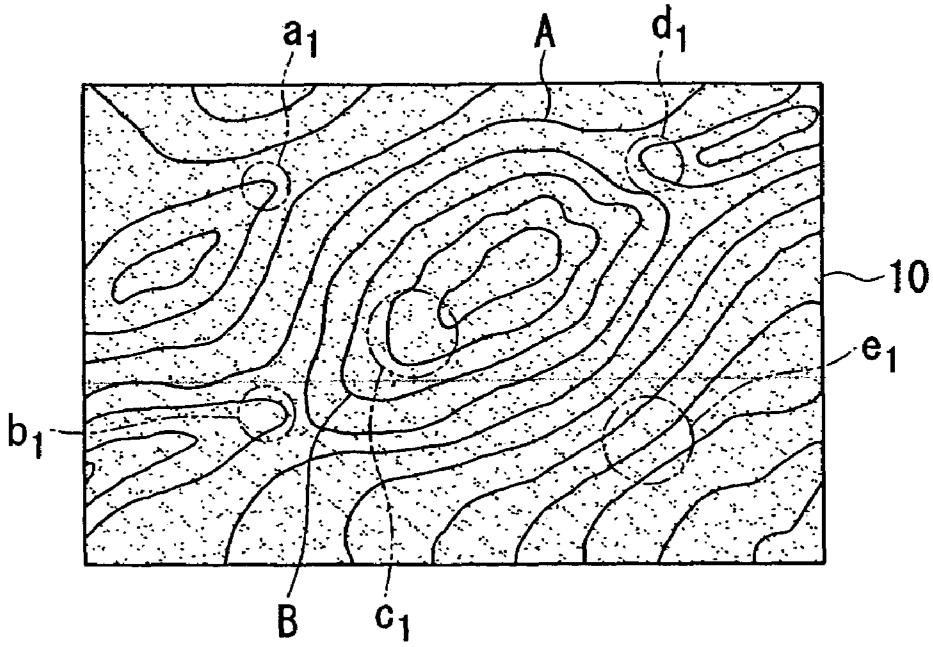
FIGS. 1A and 1B are plan views according to the first embodiment for manufacturing wooden decorative material in the present invention.

First, an image of a surface to be treated of a wood base material 10 having the design as shown in FIG. 1A is captured by a photographing device (digital or analog), such as a camera, a scanner, and a video-camera and an information 1 of this surface to be treated, according to the first information in the first aspect of the present invention, is obtained.

Figure 5A:
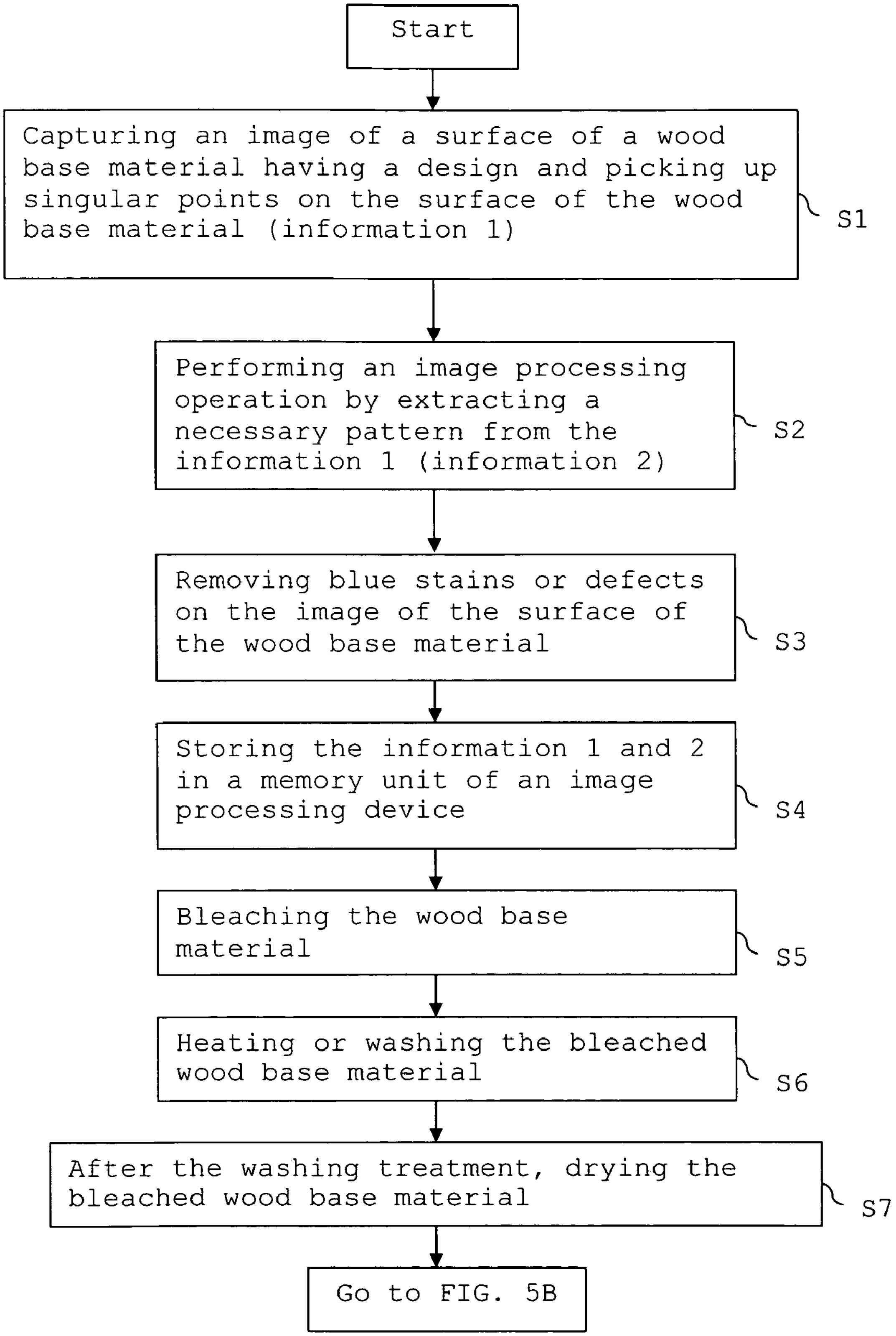
FIGS. 5A and 5B are flowcharts showing the steps in the first embodiment for manufacturing a wooden decorative material according to the present invention.

In the steps as shown in FIG. 5A, while many singular points (for example, singular points $a_1$, $b_1$, $c_1$, $d_1$ and $e_1$ in FIG. 1), which characterize the design of the treated surface of the wood base material 10, are picked up, digital information of the design of the entire surface to be treated is made. Then, these picked singular points and the computerized designs are the information 1 (step S1).

Moreover, it is acceptable for an image processing operation to be performed by extracting only a necessary pattern in the information 1 such as a dense color section (a thick line, lines A and B in FIG. 1A) which forms a grain on the treated surface by using an image processing device such as a computer and an image processing software so as to obtain the information 2, according to the first information in the first aspect of the present invention, which relates to the patterned design on the surface to be treated of the wood base material 10 (step S2).

In this image-processing operation, it is acceptable for the blue stains or defects which exist on the surface to be treated of the wood base material 10 to be removed (step S3), a pattern in which a wood grain pattern is formed in a more emphasized manner (the grain of wood), the fine part may be emphasized or corrected, or the image of the surface to be treated may be superimposed on other images or other geometric patterns image. The information 1 and 2 are converted to a database so as to be stored in a memory unit of image processing device (step S4).

For a wood base material 10, a fancy decorative material, such as Claro Walnut, Japanese cinnamon grain, rose wood, black persimmon, ebony wood, and red wood grain, and an excellent material, such as a cherry, a bubinga, cheek, and zebrawood, is used.

Next, the captured wood base material 10 is bleached by a publicly-known method step S5 according to the bleaching step in the first aspect of the present invention). In the bleaching treatment, the wood base material 10 is bleached (decolorized), as shown in FIG. 1B, so as to have only the trace of the grain of wood (broken lines C and D in FIG. 1B).

The method for the bleaching treatment in the present invention can adopt a method which is publicly known for the bleaching treatment. For example, it is possible to name methods such as a method in which a processing operation is performed for a predetermined length of time while performing a heating operation according to necessity while coating a bleach solution by a brush coating method, etc. and a method in which the wood base material 10 is dipped in the bleach solution so as to perform a processing operation for a predetermined length of time while performing a heating operation according to necessity. As the bleach solution, for example, chlorite aqueous solution, such as oxygenate, a potassium chlorite, and a sodium chlorite, and hypochlorite aqueous solution, such as a potassium hyprochlorite and a sodium hyprochlorite, which have pH 9 to 12, are used.

The treatment time is not particularly limited. For example, when the treatment temperature is 30 to 50° C. the treatment time is 10 to 200 minutes, and when the treatment temperature is 20° C., the treatment time is 1 to 24 hours.

Besides the above bleaching treatment method, the public bleaching treatment method can be adopted. For example, the method for treating natural wood by the aliphatic dialdehyde and chlorite, as described in Japanese Unexamined Patent Application, First Publication No. Sho 57-187204, the method for soaking natural wood in the mixed solution of an ascorbic acid, sodium hypochlorite, and a sodium ethylenediaminetetraacetate, as described in Japanese Unexamined Patent Application, First Publication No. Sho 62-134202, and the method for bleaching and decolorizing natural wood by a hydrogen peroxide solution, to which hydrogen peroxide derivative, such as a sodium percarbonate, is add, as described in Japanese Unexamined Patent Application, First Publication No. Hei 8-11106 can be adopted.

After bleaching treatment, it is preferable to heat or wash the bleached wood base material 10 to remove the remaining bleaching solution (step S6). If a hydrogen peroxide or a sodium hydroxide used as a bleaching solution is left in the wood base material 10, when the surface of the wood base material 10 is coated with a film or the wood base material 10 is colored, there is some fear that the color of the wood base material 10 or the color of the coating film change.

The washing treatment is also preferable from the view point of removing constituent of bleached wood (such as a lignin, a hemicellulose, and other substance changing color). Specifically, the washing treatment is that the bleached wood base material 10 is soaked in water or is placed in flowing water. In the washing treatment, water or hot water of 40 to 80° C. can be used. The washing time is not limited especially, but may be about 30 to 180 minutes.

After the above washing treatment, it is preferable to dry the bleached wood base material 10 (step S7) because when an acetylization treatment as a replacement treatment is carried out after bleaching treatment, the water constituent of the wood base material 10 and acetic anhydride as acetylization agent react. In addition, since the reaction of water and acetic anhydride is carried out with an exothermic heat, in treating wood in bulk, there is not only changing color of wood, but also increasing danger. Therefore, it is preferable that the water content of the wood base material 10 be 13% or less by mass and more preferable that the water content of the wood base material 10 be 10% or less by mass. It is further preferable that the water content of the wood base material 10 is 3% or less by mass.

As the method for drying the wood base material 10, for example, a heat hot air drying, a vacuum drying, and a heating platen drying can be adopted. In drying conditions, for example, the drying temperature is 40 to 80° C. and the drying time is 10 to 90 minutes in the case of a heat hot air drying, the drying air pressure is 5 to 120 torr, the drying temperature is 40 to 80° C., and the drying time is 1 to 8 hours in the case of the vacuum drying, and the drying temperature is 50 to 120° C. and the drying time is 1 to 30 minutes in the case of a heating platen drying.

Figure 1B:
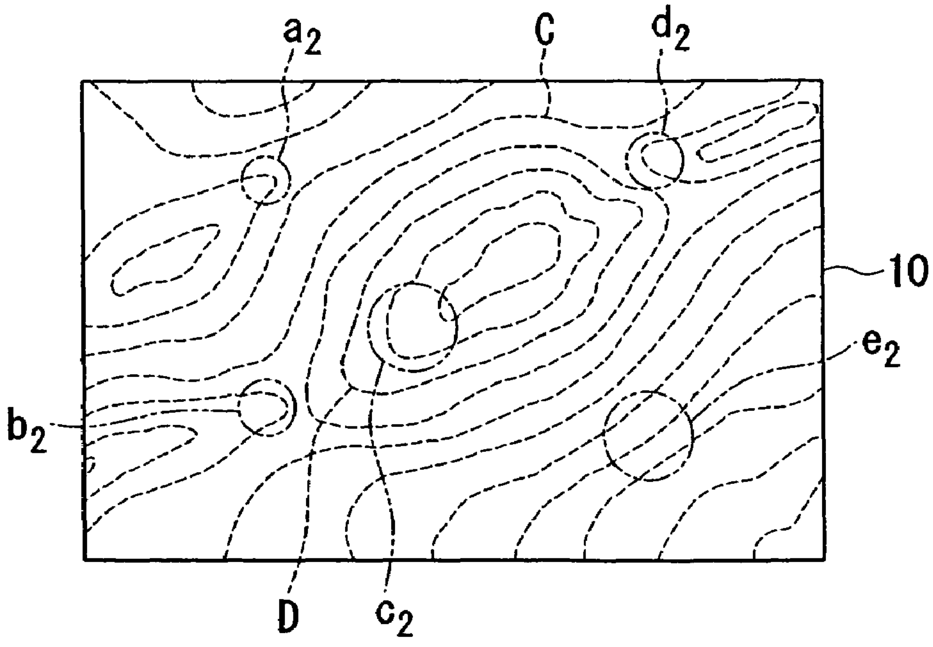
Figure 5B:
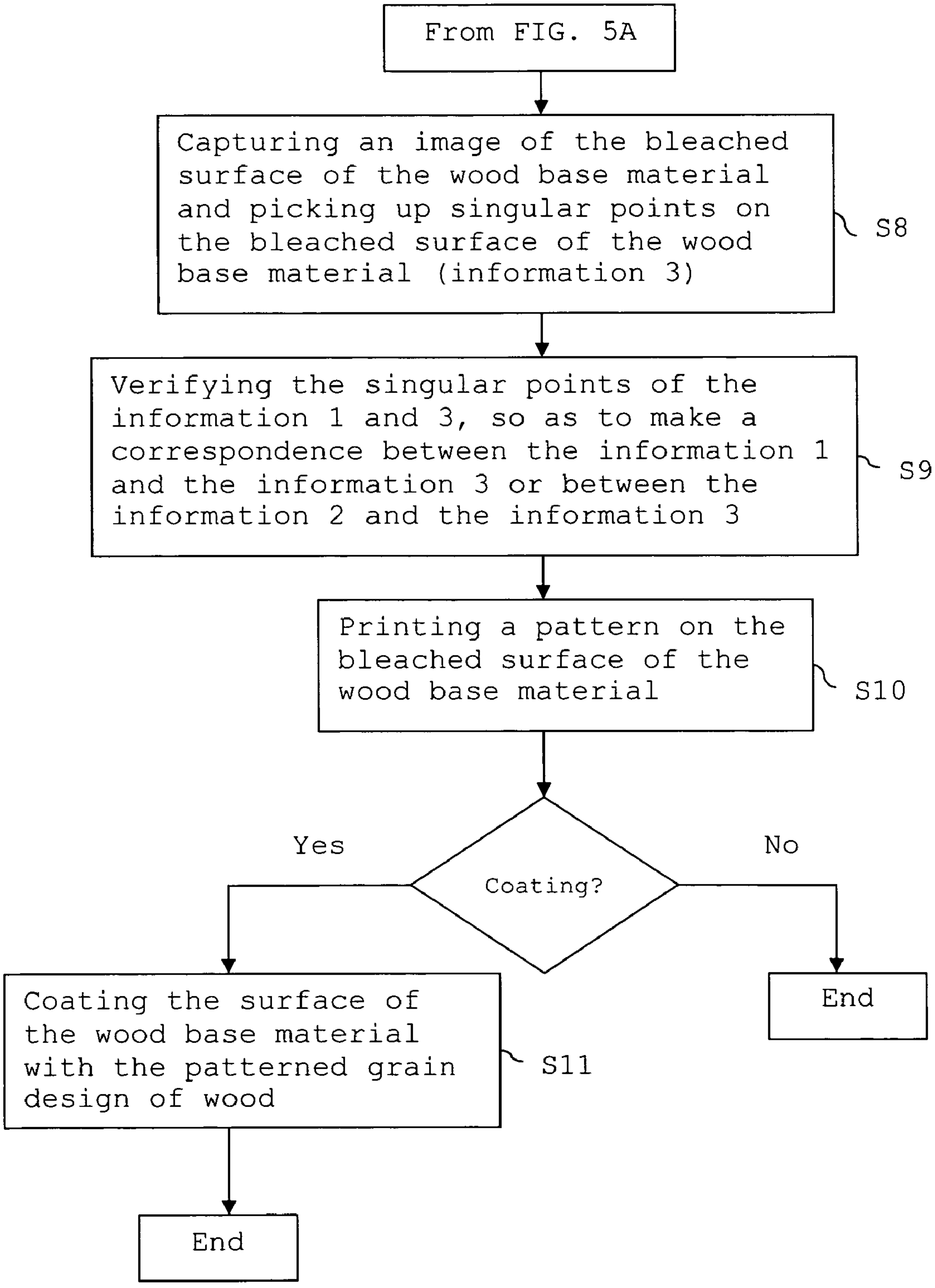

Next, as shown in FIG. 1B and the flowchart of FIG. 5B, an image of the bleached surface of the wood base material 10 is captured by a photographing device, such as a camera, a video camera, and a scanner and the information 3 of this bleached surface, according to the second information in the fourth aspect of the present invention, is obtained (step S8 according to the step of obtaining the second information regarding the bleached surface of the wood base material in the fourth aspect of the present invention).

In this step S8, while many singular points (for example, singular points $a_2$, $b_2$, c2, $d_2$, and $e_2$ in FIG. 1B), which characterize the design of the bleached surface of the wood base material 10, are picked up, a digital information of the design of the entire bleached surface is made and these picked singular points and the digital information of the designs are the information 3.

Figure 4A:
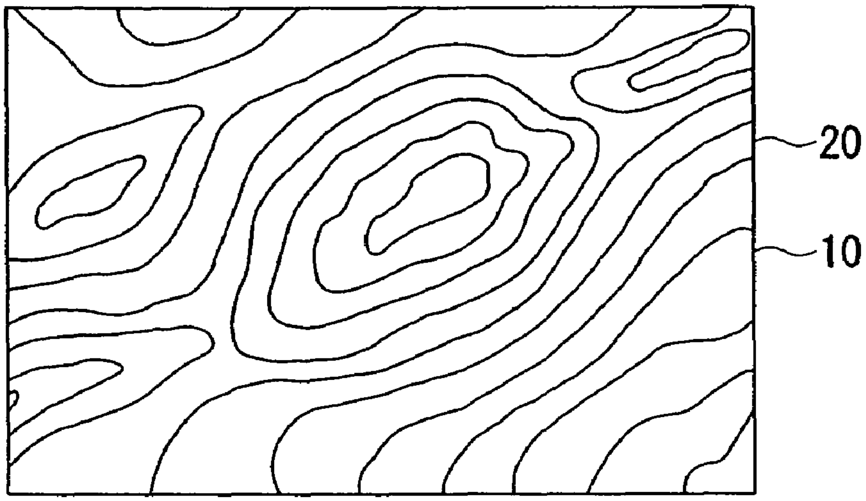
FIGS. 4A and 4B are plan views according to the first and the second embodiments for manufacturing wooden decorative material in the present invention.

Next, the above singular points $a_1$, $b_1$, $c_1$, $d_1$, and $e_1$ verify the singular points $a_2$, $b_2$, $c_2$, $d_2$, and $e_2$ or the like, so as to make a correspondence between the information 1 and the information 3 or between the information 2 and the information 3 (step 39). The bleached surface of the wood base material 10 is printed with the pattern which is the design of the surface to be treated of the wood base material 10 before bleaching treatment as shown in FIG. 4A (step S10 according to the printing step in the first aspect of the present invention).

In the present invention, the method for making a correspondence between the information 1 and the information 3 or between the information 2 and the information 3 does not limit the method for verifying the singular points. By making some marks on the surface to be treated of the wood base material 10 and verifying the marks, the information 1 or the information 2 may make a correspondence to the information 3.

For the printing method for the present invention, it is possible to adopt a publicly know printing methods. For example, a printing method in which a pigmented ink having excellent a light stability is used to perform a direct printing operation by an ink jet printer may be used.

Figure 4B:
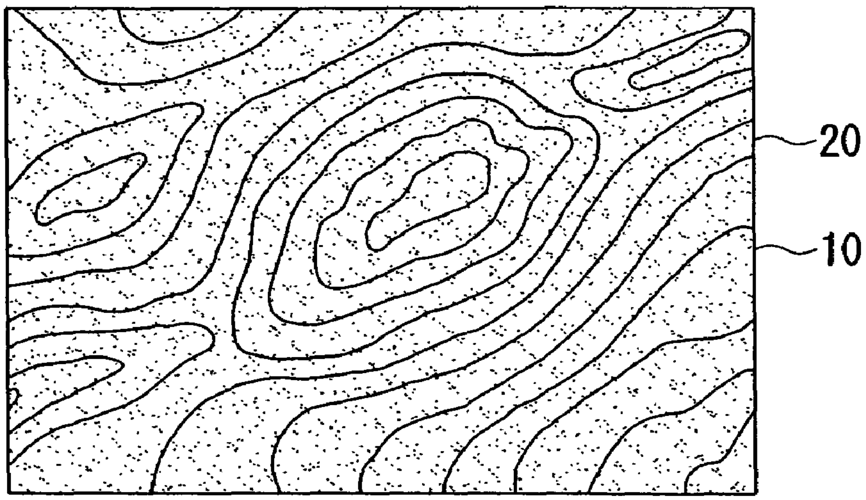

If necessary, as shown in FIG. 4B, an after-treatment, such as coating treatment, may be carried out to the treated surface of the wood base material 10 printed with the patterned grain design of wood (step S11). The resin of a coating treatment is, for example, urethane resin, polyester resin, epoxy resin, acryl resin, lacquer, alkyd resin, and melamine resin and so on. It is preferable to use a resin in which it is difficult to change the color of a coating film (having an excellent light stability).

When the treated surface of the wood base material 10 printed with the grain design of wood is coated, the ink containing dye ink which does not have an excellent light stability is acceptable in the method for printing the grain design of wood.

In the method for manufacturing a wooden decorative material of the present invention, after the surface of the bleached wood base material 10 is coated, the patterned grain design of wood may be printed on the surface of the coating.

In the method for manufacturing a wooden decorative material of the present invention, it is desirable to perform Step A for capturing an image of the surface to be treated of a wood base material 10 and obtaining an information 1 of this surface to be treated, Step C for bleaching the wood base material 10, and Step E for synchronizing the information 1 with the bleached surface of the wood material 10 and printing a pattern corresponding to the information 1 on the bleached surface of this wood base material 10.

The wooden decorative material manufactured in this manner does not have much unevenness in color, because in the bleaching treatment the defect, such as blue stain, is removed in the wood base material. Additionally, the aspect of the wooden decorative material looks like natural wood, because the design of the bleached surface of the wood base material is synchronized with the processed image and is printed with the processed image.

The wooden decorative material manufactured in this manner does not have much unevenness in color because in the bleaching treatment the defect, such as blue stain, is removed in the wood base material. In addition, the aspect of the wooden decorative material looks like natural wood because the design of the bleached surface of the wood base material corresponds to the processed image and is printed with the processed image.

According to the present invention, the second embodiment of the method for manufacturing wooden decorative material is described in the following with reference to FIGS. 2, 3A, 3B, 4A 4B, 6A and 6B.

Figure 2:
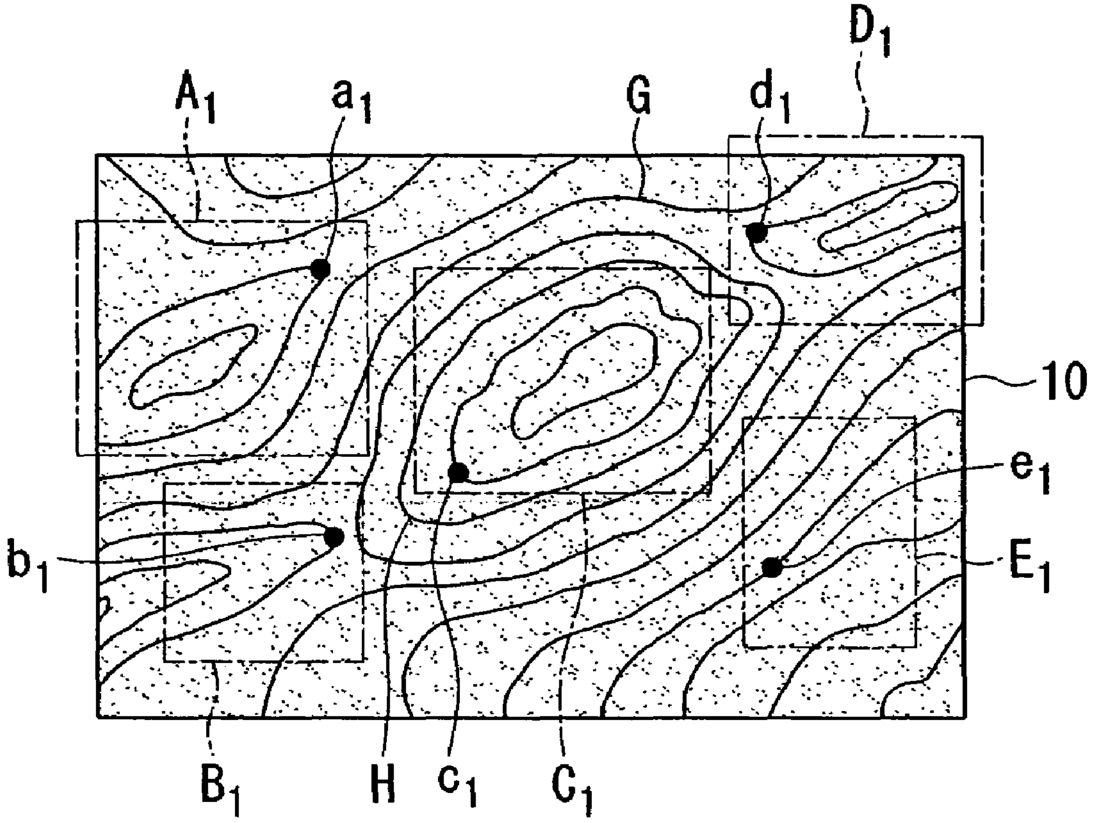
FIGS. 2, 3A, and 3B are plan views according to the second embodiment for manufacturing wooden decorative material in the present invention.

First, an image of the surface of a wood base material 10 having the design as shown in FIG. 2 is captured by photographing device, such as a camera, a scanner, and a video-camera and the information 1 of the surface to be treated is obtained (step S21).

Figure 6A:
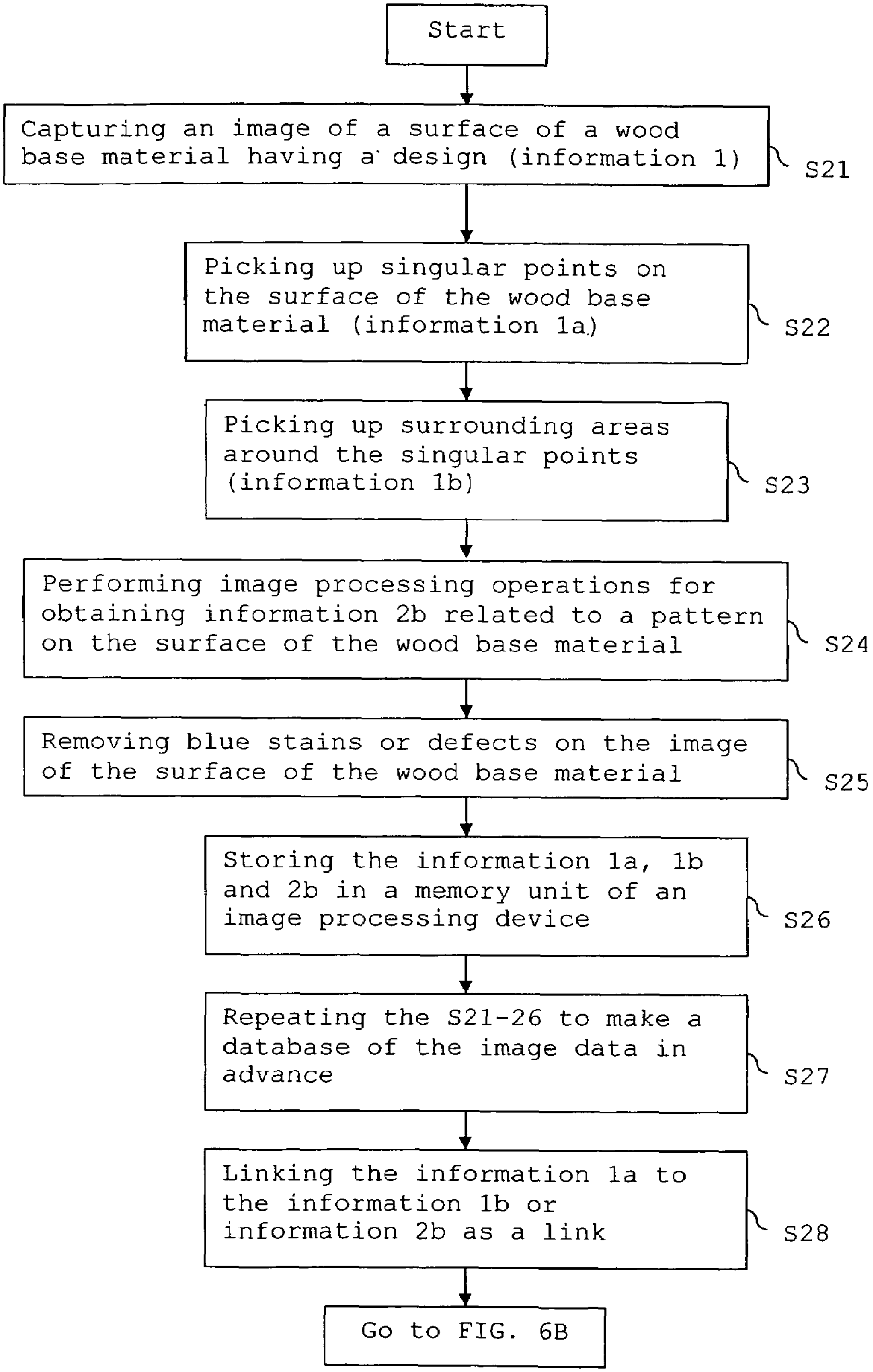
FIGS. 6A and 6B are flowcharts showing the steps in the second embodiment for manufacturing a wooden decorative material according to the present invention.
Figure 6B:
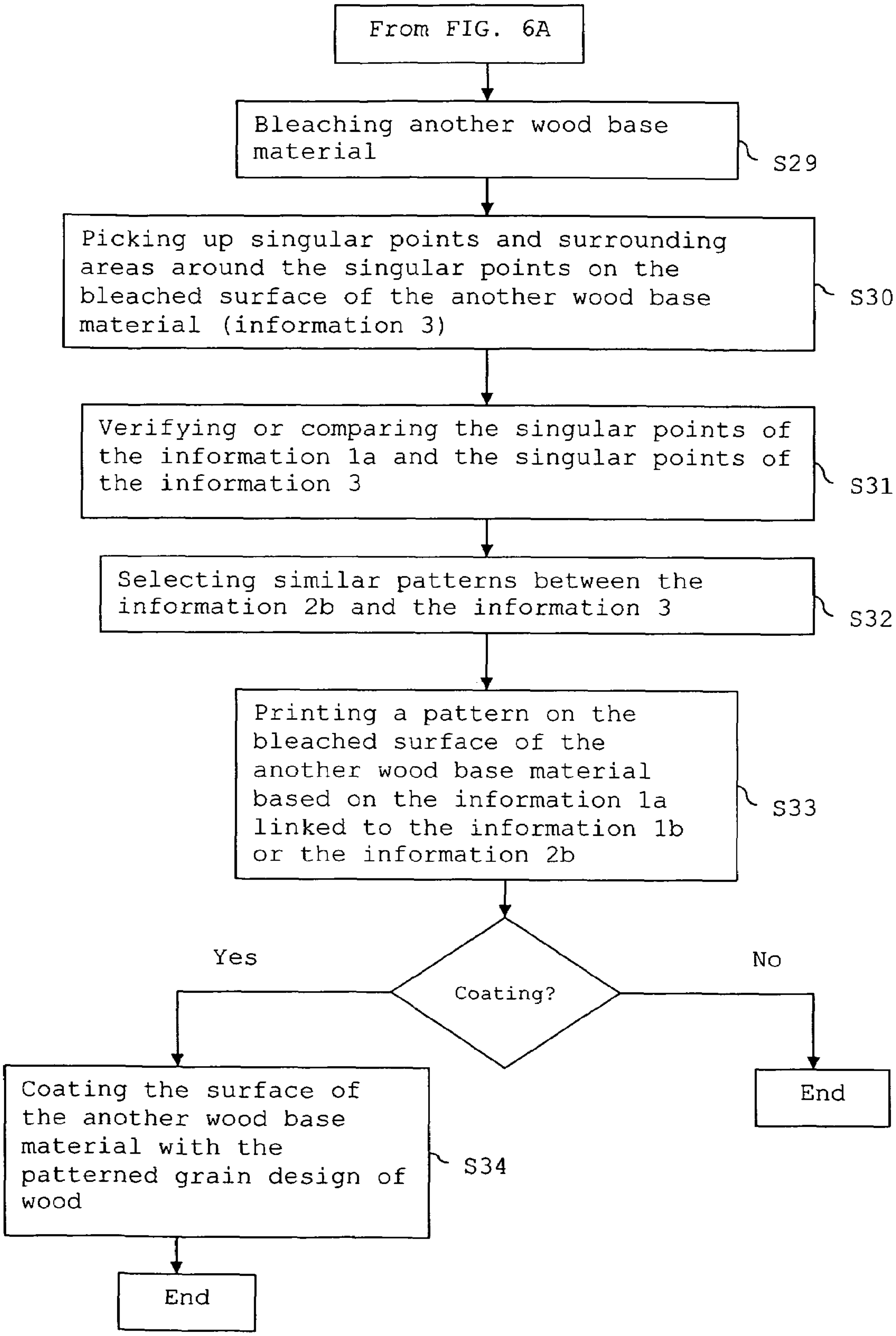

In the steps as shown in FIG. 6A, many singular points (For example, singular points $a_1$, $b_1$, $c_1$, $d_1$, and $e_1$ in FIG. 2), which characterize the design of the surface of the bleached wood base material 10, are picked up and are the information 1*a* (step S22). Digital information of the design of the surrounding areas ($A_1$, $B_1$, $C_1$, $D_1$, and $E_1$) around the singular points (singular points $a_1$, $b_1$, $c_1$, $d_1$, and $e_1$) on the surface of the wood material 10 are made and are the information 1*b* (step S23).

In such a case, it is acceptable for the information 2*b* to be obtained which relates to a pattern on a surface of the wood base material 10 which is organized by performing image processing operations such as a correcting operation and an emphasizing operation for the information 1*b* by using an image processing device such as a computer and an image processing software (step S24).

At this time, a image-processing operation of the surrounding areas $A_1$, $B_1$, $C_1$, $D_1$, and $E_1$ is performed and may be $A_1'$, $B_1'$, $C_1'$, $D_1'$, and $E_1'$. These information 1*a*, 1*b*, and 2*b* are converted to a database so as to be stored in a memory unit of an image processing device (step S26). These steps are repeated and the database stored with image data is made in advance (step S27). Then, the method for linking the information 1*a* to the information 1*b* or the information 2*b*, such as a link, is made (step S28). The information 1, the information 1*a*, the information 1*b*, and the information 2*b* are according to the first information in the first aspect of the present invention. In this image processing operation, it is acceptable for the undesired blue stains or defect which exist on the surface of the wood base material 10 to be removed (step S25), the grain design of the wood may be emphasized, the fine design (the grain of the wood) may be formed, and the image of the treated surface may be superimposed on other geometric patterns.

Figure 3A:
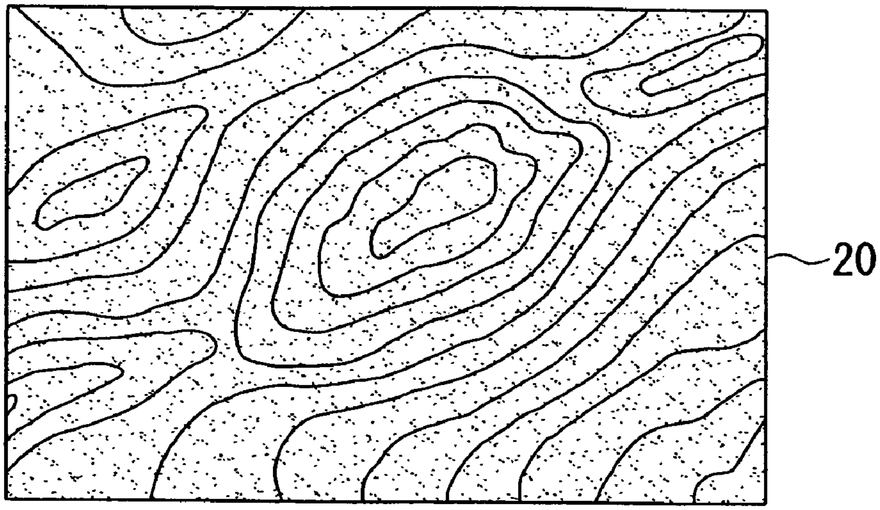

On the other hand, another wood base material 20 than the wood base material 10 is prepared and bleached by the public method which is the same method for the wood base material 10, as shown in FIG. 3A (step S29). In the bleaching treatment, the wood base material 20 is bleached (decolorized) as shown in FIG. 3B to have the trace of the grain of wood (broken line I and J and singular points $a_2$, $b_2$, $c_2$, $d_2$, and $e_2$ in FIG. 3B).

Figure 3B:
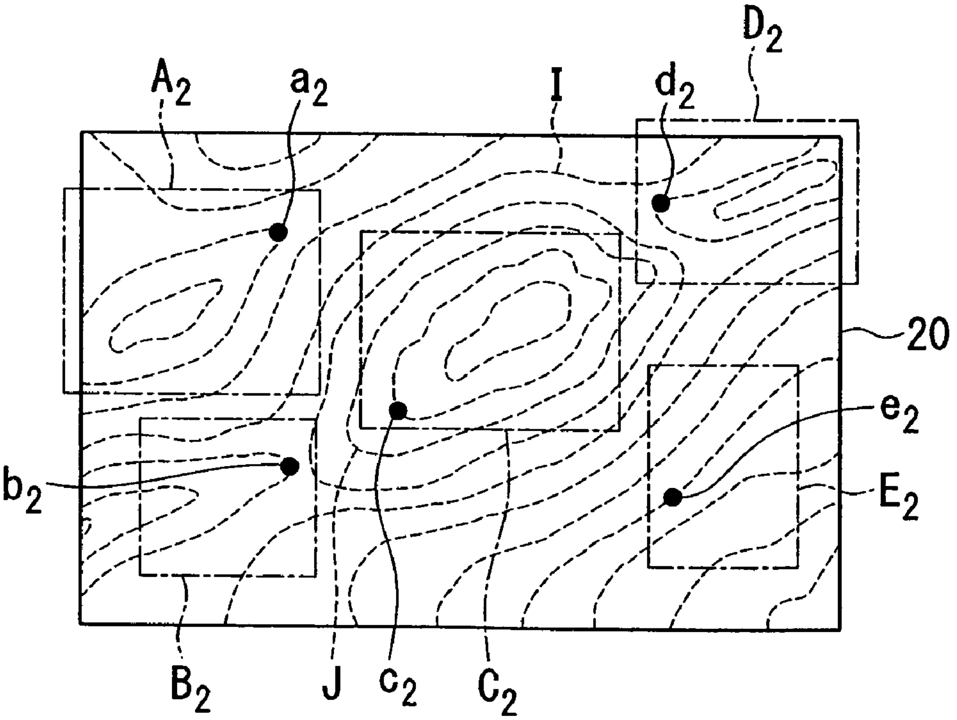

Next, an image of the bleached surface of a wood base material 20, as shown in FIG. 3B, is captured by a photographing device, such as a camera, a scanner, and a video-camera and the information 3 of this treated surface is obtained.

Then, while many singular points (for example, singular points $a_2$, $b_2$, $c_2$, $d_2$, and $e_2$ in FIG. 3B) which characterize the design of the bleached surface of the wood base material 20 are picked up (step S30), a digital information of the design of the surrounding areas ($A_2$, $B_2$, $C_2$, $D_2$, and $E_2$) around the singular points (singular points $a_2$, $b_2$, $c_2$, $d_2$, and $e_2$) on the bleached surface of the wood base material 20 are made. These singular points and the surrounding areas are the information 3, according to the second information in the fourth aspect of the present invention.

Next, by method for verifying or comparing the singular points $a_1$, $b_1$, $c_1$, $d_1$, and $e_1$ in the stored data with the singular points $a_2$, $b_2$, $c_2$, $d_2$, and $e_2$ of the wood base material 20 (step S31), the similar patterns between the above the information 1*a* and the information 3 (for example, the singular point $a_1$ for the singular point $a_2$, the singular point $c_1$ for the singular point $c_2$, and the singular point $e_1$ for the singular point $e_2$) are selected and picked up (information 2) (step S32). Then, the bleached surface of the wood base material 20 is printed with the information 1*a* linked to the information 1*b*, or the information 2*b* which has the surrounding areas $A_1$, $B_1$, $C_1$, $D_1$, and $E_1$ or the surrounding areas $A_1'$, $B_1'$, $C_1'$, $D_1'$, and $E_1'$, as shown in FIG. 4A (step S33).

In this printing step, a printing operation is performed such that the position of the information 2 (the singular points $a_1$, $b_1$, $c_1$, $d_1$, and $e_1$) between the information 3 (the singular points $a_2$, $b_2$, $c_2$, $d_2$, and $e_2$) should be centered. Then the design in the stored data is overlapped on the design of the bleached surface of the wood base material 20 so that there may not be a gap between both the designs (the grain of wood). In case many areas $A_1$ to $E_1$ are overlapped, the method for enabling to choose any of the overlapped parts suitably is taken.

For the printing method for the present invention, it is possible to adopt publicly know printing methods. For example, a printing method in which a pigmented ink having excellent light stability is used to perform a direct printing operation by an ink jet printer.

If necessary, the treated surface of the wood base material 20 printed with the design of the grain of wood, as shown in FIG. 4B, may be done by an after-treatment, such as a coating treatment (step S34). The resin using coating treatment is, for example, urethane resin, polyester resin, epoxy resin, acryl resin, lacquer, alkyd resin, and melamine resin and so on. It is preferable to use the resin being hard to changing the color of the coating film (having an excellent light stability).

When the treated surface of the wood base material 20 printed with the grain design of wood is coated, the ink using dye ink, which does not have an excellent light stability, is acceptable in the method for printing the grain design of wood. In the method for manufacturing a wooden decorative material of the present invention, after the bleached surface of the wood base material 20 is coated, the patterned grain design of wood may be printed on the surface of the coating.

The wooden decorative material manufactured in this manner does not have much unevenness because in the bleaching treatment, the defect, such as blue stain, is removed in the wood material. The aspect of the wooden decorative material looks like natural wood ideally, because the similar patterns between the design of the bleached surface of the wood base material and the ideal design of the captured surface of the same kind of the wood material, are verified and the bleached surface of the wood base material is printed with the ideal design. Also, each wooden decorative material has individuality due to each wood base material and there are various decorative materials.

In the method for manufacturing a wooden decorative material of the present invention, it is acceptable for the decorative material made from the natural material having scarcity value (stone material and leather material and so on).

In addition, in the method for manufacturing a wooden decorative material of the present invention, it is acceptable for the goods group having wooden decorative material used for instruments, furniture, car interior equipment, and house and natural material, such as a stone material and a leather material.

According to the method for manufacturing a wooden decorative material of the present invention, the present invention provides a wooden decorative material with excellent color evenness because in the bleaching treatment the amount of the coloring substance can be reduced. Also, in the bleaching treatment, defect in the wood base material, such as a blue stain, can be removed.

According to method for a wooden decorative material of the present invention, the present invention provides a wooden decorative material having the aspect of natural wood because the bleached surface of the wood base material corresponds to the image-processing design and is printed with the image-processing design. This is because the design with excellent color evenness can be printed. The present invention provides wooden decorative material which can be used outdoors. This is because in the image processing operation of the design of the wood base material, a blue stain or undesired defect can be removed in the treated surface of the wood base material beforehand. The present invention provides the wooden decorative material having a design of a fancy wood (the grain of wood), that is difficult by the prior art because of a poor light stability.

In addition, according to the method for manufacturing a wooden decorative material of the preset invention, the present invention provides a wooden decorative material having higher quality because in the image processing operation of the design of the wood base material, the grain of wood can be emphasized. Also, the present invention provides the finishing wooden decorative material having high color because in the image processing operation of the design of the wood base material, the color tone of the grain of wood can be controlled, which is difficult by the prior art.

The similar patterns between the design of the bleached surface of the wood base material and the image-processing design of the surface of wood material, which are different from the bleached wood base material, are verified. Then, the bleached surface of the wood base material is printed with the image-processing design, so the present invention provides the wooden decorative material having the aspect of the desired natural wood. The print of the grain design of wood can provide an excellent light stability, so the present invention provides the wooden decorative material which can be used outdoors.

Because the surface of a wood base material having low quality can be printed with the grain design of wood of fancy wood having high quality, the prevent invention provides an inexpensive wooden decorative material having high quality.

What is claimed:

1. A method for manufacturing a wooden decorative material, comprising the steps of:

a bleaching step for bleaching a surface of a wood base material;

a verifying step for verifying first singular points of the surface of the wood base material in a first information, and second singular points of the surface of the wood base material bleached by said step of bleaching; and a printing step for printing a pattern corresponding to the first information on the surface of the wood base material bleached by said step of bleaching with making a substantial correspondence between the first singular points and the second singular points obtained by said step of verifying.

2. The method for manufacturing a wooden decorative material according to claim 1, further comprising the step of obtaining the first information of the surface of the wood base material by capturing an image of the surface of the wood base material before said step of bleaching.

3. The method for manufacturing a wooden decorative material according to claim 2, further comprising the step of performing an image-processing operation on the image of the surface of the wood base material in the first information obtained by said step of obtaining.

4. The method for manufacturing a wooden decorative material according to claim 1, further comprising the step of obtaining a second information by capturing an image of the surface of the wood base material bleached in said step of bleaching.

5. The method for manufacturing a wooden decorative material according to claim 4, wherein said step of verifying includes selecting similar patterns between the first information and the second information, and said step of printing includes using similar patterns selected from the first information that correspond to similar patterns of the second information.

6. The method for manufacturing a wooden decorative material according to claim 2, wherein said step of obtaining the first information includes selecting from among image data obtained by capturing an image of a surface of a predetermined wood material or a processed image of the image data obtained by capturing an image of a surface of the predetermined wood material.

* * * * *